(12) United States Patent
Neishi et al.

(10) Patent No.: US 10,487,372 B2
(45) Date of Patent: Nov. 26, 2019

(54) HIGH-STRENGTH BOLT

(71) Applicant: Nippon Steel & Sumitomo Metal Corporation, Tokyo (JP)

(72) Inventors: Yutaka Neishi, Tokyo (JP); Naoyuki Sano, Tokyo (JP); Naoki Matsui, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 15/780,574

(22) PCT Filed: Nov. 15, 2016

(86) PCT No.: PCT/JP2016/083738
§ 371 (c)(1),
(2) Date: May 31, 2018

(87) PCT Pub. No.: WO2017/094487
PCT Pub. Date: Jun. 8, 2017

(65) Prior Publication Data
US 2018/0347004 A1 Dec. 6, 2018

(30) Foreign Application Priority Data
Dec. 4, 2015 (JP) ................ 2015-237721

(51) Int. Cl.
*C21D 1/18* (2006.01)
*C21D 9/00* (2006.01)
(Continued)

(52) U.S. Cl.
CPC ............ *C21D 9/0093* (2013.01); *C21D 1/18* (2013.01); *C21D 6/004* (2013.01); *C21D 6/005* (2013.01);
(Continued)

(58) Field of Classification Search
CPC .......... C21D 1/18; C21D 6/004; C21D 6/005; C21D 6/008; C21D 8/005; C21D 9/00;
(Continued)

(56) References Cited

U.S. PATENT DOCUMENTS

| 2007/0017610 A1* | 1/2007 | Yoshida ............. B21H 3/02 148/654 |
| 2015/0003935 A1* | 1/2015 | Matsumoto ........ C22C 38/00 411/424 |

(Continued)

FOREIGN PATENT DOCUMENTS

| CN | 102791898 A | 11/2012 |
| CN | 104204254 A | 12/2014 |

(Continued)

OTHER PUBLICATIONS

"Elements of Metallurgy and Engineering Alloys", ed. by F.C. Campbell, ASM International, Materials Park, 2008, pp. 185-191.
(Continued)

*Primary Examiner* — Jie Yang
(74) *Attorney, Agent, or Firm* — Banner & Witcoff, Ltd.

(57) ABSTRACT

A high-strength bolt is provided that has high strength and excellent hydrogen embrittlement resistance characteristics. A bolt according to this invention has a chemical composition consisting of, in mass %, C: 0.22 to 0.40%, Si: 0.10 to 1.50%, Mn: 0.20 to less than 0.40%, P: 0.020% or less, S: 0.020% or less, Cr: 0.70 to 1.45%, Al: 0.005 to 0.060%, Ti: 0.010 to 0.045%, B: 0.0003 to 0.0040%, N: 0.0015 to 0.0080% and O: 0.0020% or less, with a balance being Fe and impurities, and satisfying Formula (1) and Formula (2), and with the high-strength bolt having a tensile strength of 1000 to 1300 MPa.

$$0.50 \leq C + Si/10 + Mn/5 + 5Cr/22 \leq 0.85 \quad (1)$$

$$Si/Mn > 1.0 \quad (2)$$

(Continued)

Where, a content (mass %) of a corresponding element is substituted for each symbol of an element in Formula (1) and Formula (2).

8 Claims, 3 Drawing Sheets

(51) Int. Cl.
| | |
|---|---|
| *C22C 38/54* | (2006.01) |
| *F16B 35/00* | (2006.01) |
| *C21D 6/00* | (2006.01) |
| *C21D 8/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |

(52) U.S. Cl.
CPC ............. *C21D 6/008* (2013.01); *C21D 8/005* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *F16B 35/00* (2013.01)

(58) Field of Classification Search
CPC ..... C21D 9/0093; C22C 38/00; C22C 38/001; C22C 38/002; C22C 38/02; C22C 38/04; C22C 38/06; C22C 38/42; C22C 38/44; C22C 38/46; C22C 38/48; C22C 38/50; C22C 38/54; F16B 35/00
USPC .............................................................. 420/8
See application file for complete search history.

(56) References Cited

U.S. PATENT DOCUMENTS

| | | | |
|---|---|---|---|
| 2017/0159693 A1* | 6/2017 | Matsumoto | .............. C21D 8/06 |
| 2019/0003000 A1* | 1/2019 | Neishi | ..................... C22C 38/00 |

FOREIGN PATENT DOCUMENTS

| | | |
|---|---|---|
| JP | H09-104945 A | 4/1997 |
| JP | H10-53834 A | 2/1998 |
| JP | H11-293401 A | 10/1999 |
| JP | 2001-234277 A | 8/2001 |
| JP | 2006-291295 A | 10/2006 |
| JP | 2008-156678 A | 7/2008 |
| JP | 2010196094 A | 9/2010 |
| JP | 2012-162798 A | 8/2012 |
| JP | 2013-227602 A | 11/2013 |
| JP | 2015189987 A | 11/2015 |
| JP | 2017141502 A | 8/2017 |
| WO | 2007074986 A1 | 7/2007 |
| WO | 2015045951 A1 | 4/2015 |
| WO | 2016/080308 A1 | 5/2016 |

OTHER PUBLICATIONS

English Abstract of JP-2010-196094.
English Abstract of JP-2015-189987A.
English Abstract of CN-102791898.
English Abstract of CN-104204254.
English Abstract of WO-2015-045951-2.
English Abstract of JP 2006-291295.

* cited by examiner

HIGH-STRENGTH BOLT

RELATED APPLICATIONS

This application is a National Stage Application under 35 U.S.C. 371 of co-pending PCT application PCT/JP2016/083738 designating the United States and filed Nov. 15, 2016; which claims the benefit of JP application number 2015-237721 and filed Dec. 4, 2015 each of which are hereby incorporated by reference in their entireties.

TECHNICAL FIELD

The present invention relates to a bolt, and more particularly relates to a bolt with high strength.

BACKGROUND ART

In recent years, to address environmental problems and the like, weight reduction and enhanced strength are being sought with respect to members used in automobiles, industrial machinery, buildings and the like. In particular, tensile strength of 1000 MPa or more is being demanded with respect to bolts for automobiles, such as engine cylinder head bolts and connecting rod bolts.

However, if a bolt has high tensile strength of 1000 MPa or more, the susceptibility to hydrogen embrittlement increases, and hydrogen embrittlement resistance (delayed fracture) characteristics are lowered. SCM steel (JIS Standard) that contains a large amount of an alloying element such as Mo, and alloy steel that contains an expensive alloying element such as V, are used as the starting material for such high-strength bolts. These alloy steels are manufactured into wire rods, and are further subjected to wire drawing and cold forging to be manufactured into bolts.

In the case of using the aforementioned alloy steels as bolts, hydrogen embrittlement resistance characteristics are enhanced. However, because these alloy steels contain alloying elements in large amounts, it leads to an increase in the cost of the steel material. Further, in recent years, the prices of alloying elements have risen sharply, and the supply-and-demand environment easily fluctuates. Therefore, there is a need for a bolt, in which enhanced strength and excellent hydrogen embrittlement resistance characteristics can be realized while reducing or omitting these alloying elements and keeping down the cost of the steel material.

To keep down the cost of the steel material, it is sufficient to reduce the amount of alloying elements, such as Mo and V, contained in the steel. If the amount of alloying elements is reduced, the hardenability of the steel material decreases, and when the steel material is hot rolled to produce wire rods, the formation of a hard microstructure such as bainite can be suppressed. Therefore, a softening heat treatment can be omitted or simplified, and the production cost is reduced. However, it causes difficulty in providing the bolt with high strength, and the hydrogen embrittlement resistance characteristics also decrease.

Therefore, studies are being conducted with respect to high-strength bolts that contain boron (B) instead of alloying elements, such as Mo and V. Similarly to alloying elements such as Mo and V, B enhances the hardenability of steel. However, if B-containing steel is used for a high-strength bolt whose tensile strength is 1000 MPa or more, in some cases, the hydrogen embrittlement resistance characteristics will be low.

Bolts for overcoming this problem are proposed in Japanese Patent Application Publication No. 2012-162798 (Patent Literature 1), Japanese Patent Application Publication No. 11-293401 (Patent Literature 2), Japanese Patent Application Publication No. 10-53834 (Patent Literature 3) and Japanese Patent Application Publication No. 2008-156678 (Patent Literature 4). The bolts proposed in these Patent Literatures contain boron to thereby increase hardenability, strengthen grain boundaries to increase the strength, and also enhance hydrogen embrittlement resistance characteristics.

Specifically, the steel for a high-strength bolt that is disclosed in Patent Literature 1 contains, in mass %, C: 0.20 to less than 0.40%, Si: 0.20 to 1.50%, Mn: 0.30 to 2.0%, P: 0.03% or less (not including 0%), S: 0.03% or less (not including 0%), Ni: 0.05 to 1.0%, Cr: 0.01 to 1.50%, Cu: 1.0% or less (including 0%), Al: 0.01 to 0.10%, Ti: 0.01 to 0.1%, B: 0.0003 to 0.0050% and N: 0.002 to 0.010%, in which one or more types selected from the group consisting of Cu, Ni and Cr are contained in a total amount of 0.10 to 3.00/o, with the balance being Fe and unavoidable impurities. In the steel, a ratio ([Si]/[C]) between the Si content [Si] and the C content [C] is 1.0 or more, and the steel has a ferrite and pearlite microstructure. It is described in Patent Literature 1 that by this means a B-added high-strength bolt that is excellent in delayed fracture resistance can be obtained.

In the B-added high-strength bolt disclosed in Patent Literature 1, the Si content is made higher than the C content to increase the strength of the matrix by means of Si and to improve the delayed fracture resistance. However, because Ni that is an expensive element is contained as an essential element, the cost of the steel material is high.

The steel for a bolt that is disclosed in Patent Literature 2 contains, in mass %, C: 0.10 to 0.45%, B: 0.0003 to 0.0050%, Ti: 0.01 to 0.1% and N: 0.0025 to 0.010%, and furthermore, as other constituents, contains Si: 0.03 to 0.5%, Mn: 0.3 to 1.5% and Al: 0.01 to 0.10%, with the balance being Fe and unavoidable impurities. The steel also satisfies at least one of the conditions of the following (1) and (2). (1) The Ti amount contained in precipitates having a grain size of more than 0.1 µm extracted by the extraction residue method is 60% or more of the total Ti amount contained in the steel material. (2) The average number of Ti-based precipitates having a grain size of 0.01 to 0.2 µm observed by electron microscope observation according to the extraction replica method is from 10 to 500 in an observation visual field of 25 µm². It is described in Patent Literature 2 that by this means a bolt made of B-containing steel that is excellent in cold workability and delayed fracture resistance can be obtained.

However, in the bolt disclosed in Patent Literature 2, the Si content is low, and the mass ratio between Si and Mn is less than 1.0. Therefore, it is difficult to control inclusions, and the hydrogen embrittlement resistance characteristics are low in some cases.

A steel for a high-strength bolt that is disclosed in Patent Literature 3 contains, in mass %, B: 0.0008 to 0.004%, C: 0.4% or less (not including 0%), Ti: 0.025 to 0.06%, and N: 0.006% or less (not including 0%), with the balance being Fe and unavoidable impurities. In this steel, the relation between a ferrite grain size FGc and Ti compounds excluding TiN during hot rolling satisfies the expression: [amount of Ti compounds excluding TiN/FGc$^{1/2}$]×1000≥3. It is described in Patent Literature 3 that, as a result, the austenite grain size number is 5 or more, and a high-strength bolt having a tensile strength that is more than 785 N/mm² can be obtained.

However, in the high-strength bolt disclosed in Patent Literature 3, when there is a high Mn content and a low Cr content, the hydrogen embrittlement resistance characteristics are low in some cases.

A steel for a high-strength bolt disclosed in Patent Literature 4 contains, in mass %, C: more than 0.15% to 0.30% or less, Si: 1.0% or less, Mn: 1.5% or less, Ti: 0.1% or less, Mo: 0.3% or more to 0.5% or less and B: 0.0005% or more to 0.01% or less, with the balance being Fe and impurities. The steel is quenched, and thereafter subjected to tempering at 100 to 400° C., and the steel microstructure becomes a microstructure in which the average prior-austenite grain size after quenching is 10 µm or less. It is described in Patent Literature 4 that, by this means, a high-strength bolt that has the bolt strength range from approximately 1200 to 1600 MPa and has excellent delayed fracture resistance characteristics and corrosion resistance can be obtained.

However, because the bolt disclosed in Patent Literature 4 contains 0.3 to 0.5% by mass of Mo, the hardenability is too high. Consequently, it is necessary to carry out a softening heat treatment for an extended period of time before performing wire drawing and cold forging. In this case, the production cost increases significantly in some instances.

CITATION LIST

Patent Literature

Patent Literature 1: Japanese Patent Application Publication No. 2012-162798
Patent Literature 2: Japanese Patent Application Publication No. 11-293401
Patent Literature 3: Japanese Patent Application Publication No. 10-53834
Patent Literature 4: Japanese Patent Application Publication No. 2008-156678

SUMMARY OF INVENTION

Technical Problem

An objective of the present invention is to provide a bolt that has high strength and also has excellent hydrogen embrittlement resistance characteristics.

Solution to Problem

A high-strength bolt according to the present invention has a chemical composition that consists of, in mass %, C: 0.22 to 0.40%, Si: 0.10 to 1.50%, Mn: 0.20 to less than 0.40%, P: 0.020% or less, S: 0.020% or less, Cr: 0.70 to 1.45%, Al: 0.005 to 0.060%, Ti: 0.010 to 0.045%, B: 0.0003 to 0.0040%, N: 0.0015 to 0.0080%, O: 0.0020% or less, Cu: 0 to 0.50%, Ni: 0 to 0.30%, Mo: 0 to 0.04%, V: 0 to 0.05% and Nb: 0 to 0.050%, with a balance being Fe and impurities, and that satisfies Formula (1) and Formula (2), wherein the bolt has tensile strength of 1000 to 1300 MPa:

$$0.50 \leq C+Si/10+Mn/5+5Cr/22 \leq 0.85 \quad (1)$$

$$Si/Mn>1.0 \quad (2)$$

where, a content (mass %) of a corresponding element is substituted for each symbol of an element in Formula (1) and Formula (2).

A high-strength bolt according to the present invention has high strength and also has excellent hydrogen embrittlement resistance characteristics.

DESCRIPTION OF EMBODIMENTS

The present inventors conducted investigations and studies regarding the components and micro-structure of steel that have effect on the tensile strength and hydrogen embrittlement resistance characteristics of a bolt, by using B-containing steel containing, which contains C, Si, Mn, Cr and B and the like and does not contain an expensive alloying elements, such as Mo or V in a large amount. As a result, the present inventors obtained the following findings.

[Regarding Tensile Strength of Bolt]

Sufficient hardenability is required to provide the bolt with a high tensile strength of 1000 to 1300 MPa. However, if the hardenability is too high, the cold workability will decrease. In this case, before carrying out wire drawing and cold working such as cold forging with respect to a steel material such as a wire rod, a softening heat treatment must be performed for an extended time period in multiple times for the purpose of softening the steel material. Consequently, even if alloying elements such as Mo and V are not contained in a large amount, the production cost increases. Therefore, a steel material that enables cold working even without performing a softening heat treatment multiple times for an extended time period, and that has hardenability, with which the aforementioned tensile strength, is obtained is desirable.

In a case where the chemical composition of a bolt satisfies Formula (1), excellent cold workability and hardenability are obtained:

$$0.50 \leq C+Si/10+Mn/5+5Cr/22 \leq 0.85 \quad (1)$$

where, a content (mass %) of a corresponding element is substituted for each symbol of an element in Formula (1).

Herein, fn1 is defined as equal to C+Si/10+Mn/5+5Cr/22. C, Si, Mn and Cr are each elements that increase hardenability. Therefore, fn1 serves as an index of hardenability and cold workability.

If fn1 is too low, sufficient hardenability is not obtained. On the other hand, if fn1 is too high, the hardenability will be too high. In this case, when the steel for a bolt is rolled into a wire rod, bainite is formed and the strength and hardness increase. Therefore, sufficient cold workability is not obtained unless a softening heat treatment for an extended time period is carried out multiple times prior to a wire drawing process and a cold forging process that are subsequent processes. If fn1 satisfies Formula (1), while obtaining excellent hardenability, sufficient cold workability is obtained even if a softening heat treatment is not performed multiple times for an extended time period.

[Regarding Hydrogen Embrittlement Resistance Characteristics]
[Regarding Relation between Si/Mn and Hydrogen Embrittlement Resistance Characteristics]

Even if the bolt has a high tensile strength of 1000 to 1300 MPa, as long as Formula (2) is satisfied, excellent hydrogen embrittlement resistance characteristics are obtained:

$$Si/Mn > 1.0 \tag{2}$$

where, a content (mass %) of a corresponding element is substituted for each symbol of an element in Formula (2). In the following description, fn2 is defined as equal to Si/Mn. fn2 corresponds to the left-hand side of Formula (2). Formula (2) is described hereunder.

Figure 1:
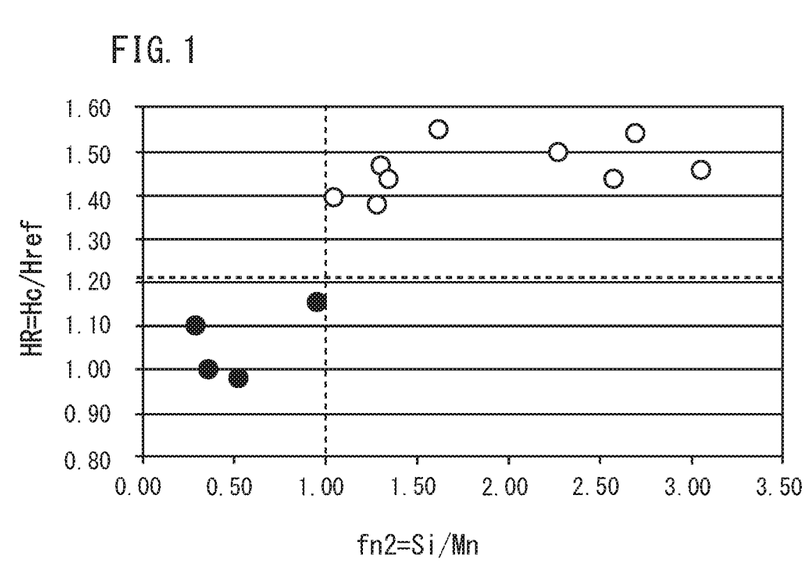
FIG. 1 is a view illustrating the relation between a critical diffusible hydrogen content and Si/Mn contained in a bolt.

FIG. 1 is a view illustrating the relation between a critical diffusible hydrogen content HR and fn2. FIG. 1 was obtained by the following method.

Steels a to m having the chemical compositions shown in Table 1 were subjected to vacuum melting to produce ingots of 50 kg.

a constant load so that tensile stress of nominal stress of 1080 MPa was applied to a V-notch cross-section of the test specimen was performed. Programmed temperature gas chromatography was performed using a gas chromatography apparatus with respect to the test specimens that ruptured during the test and the test specimens that did not rupture to thereby measure the amount of hydrogen in each test specimen. After measurement, with respect to each of the steels, the maximum hydrogen amount at which a test specimen did not rupture was defined as the critical diffusible hydrogen content Hc.

In addition, taking a critical diffusible hydrogen content Href of steel m having a chemical composition corresponding to SCM435 of JIS G4053 (2008) as a reference, a critical diffusible hydrogen content ratio HR (hereunder, referred to simply as "HR") was defined by the following Formula (A).

$$HR = Hc/Href \tag{A}$$

The HR is an index of hydrogen embrittlement resistance characteristics. FIG. 1 was created based on the obtained HR and fn2 of each steel.

TABLE 1

| | Chemical Composition (unit is mass percent; balance is Fe and impurities) | | | | | | | | | | | | | | | | | | |
|---|---|---|---|---|---|---|---|---|---|---|---|---|---|---|---|---|---|---|---|
| Steel | C | Si | Mn | P | S | Cr | Al | Ti | B | N | O | Cu | Ni | Mo | V | Nb | fn1 | fn2 | HR |
| a | 0.31 | 0.42 | 0.33 | 0.009 | 0.010 | 1.06 | 0.036 | 0.021 | 0.0025 | 0.0044 | 0.0011 | — | — | — | — | — | 0.66 | 1.27 | 1.38 |
| b | 0.33 | 0.62 | 0.38 | 0.010 | 0.012 | 1.08 | 0.041 | 0.016 | 0.0021 | 0.0034 | 0.0012 | — | — | — | — | — | 0.71 | 1.63 | 1.55 |
| c | 0.37 | 0.41 | 0.39 | 0.008 | 0.011 | 1.16 | 0.038 | 0.019 | 0.0019 | 0.0032 | 0.0011 | — | — | — | — | — | 0.75 | 1.05 | 1.40 |
| d | 0.26 | 0.65 | 0.25 | 0.006 | 0.009 | 1.05 | 0.040 | 0.024 | 0.0030 | 0.0039 | 0.0012 | — | — | — | — | — | 0.61 | 2.60 | 1.44 |
| e | 0.35 | 0.80 | 0.34 | 0.012 | 0.010 | 1.21 | 0.039 | 0.022 | 0.0027 | 0.0041 | 0.0013 | 0.02 | 0.04 | 0.04 | — | — | 0.77 | 2.35 | 1.50 |
| f | 0.28 | 1.23 | 0.39 | 0.009 | 0.014 | 1.25 | 0.040 | 0.021 | 0.0028 | 0.0039 | 0.0015 | 0.03 | 0.05 | — | 0.02 | — | 0.77 | 3.15 | 1.46 |
| g | 0.31 | 0.65 | 0.24 | 0.011 | 0.005 | 1.21 | 0.031 | 0.020 | 0.0024 | 0.0041 | 0.0016 | 0.02 | 0.06 | 0.05 | 0.03 | — | 0.70 | 2.71 | 1.54 |
| h | 0.37 | 0.28 | 0.21 | 0.009 | 0.014 | 1.34 | 0.042 | 0.021 | 0.0032 | 0.0043 | 0.0018 | — | — | — | — | 0.027 | 0.74 | 133 | 1.43 |
| i | 0.29 | 0.41 | 0.31 | 0.010 | 0.009 | 1.42 | 0.032 | 0.020 | 0.0024 | 0.0040 | 0.0015 | 0.02 | 0.03 | 0.02 | 0.01 | 0.030 | 0.72 | 1.32 | 1.47 |
| j | 0.26 | 0.20 | 0.39 | 0.012 | 0.016 | 0.71 | 0.039 | 0.014 | 0.0025 | 0.0041 | 0.0011 | — | — | — | — | — | 0.52 | 0.51 | 0.98 |
| k | 0.34 | 0.36 | 0.38 | 0.011 | 0.009 | 0.74 | 0.028 | 0.018 | 0.0022 | 0.0061 | 0.0015 | — | — | — | — | — | 0.62 | 0.95 | 1.15 |
| l | 0.29 | 0.12 | 0.38 | 0.010 | 0.003 | 0.75 | 0.032 | 0.022 | 0.0019 | 0.0040 | 0.0014 | — | — | 0.02 | — | — | 0.55 | 0.32 | 1.10 |
| m | 0.36 | 0.24 | 0.66 | 0.008 | 0.006 | 1.04 | 0.046 | 0.003 | — | 0.0060 | 0.0021 | 0.02 | 0.02 | 0.22 | — | — | 0.75 | 0.36 | 1.00 |

Figure 2:
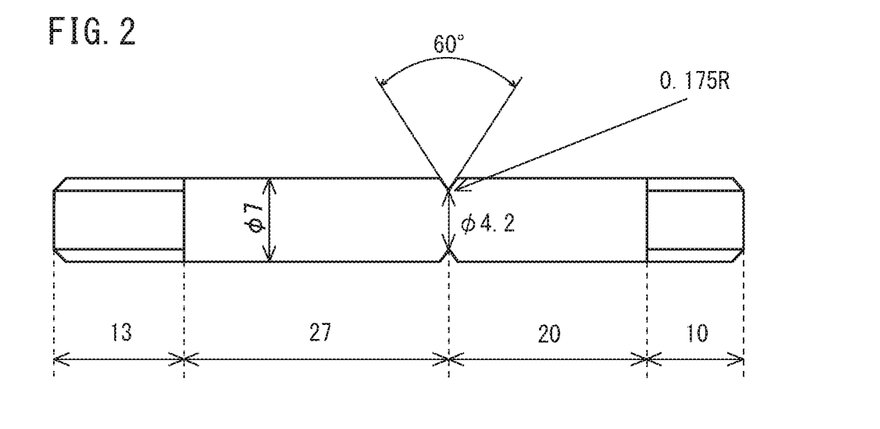
FIG. 2 is a side view of a test specimen with an annular V-notch.

After each produced ingot was heated to 1200 to 1300° C., hot extend forging was carried out as a simulated hot rolling to produce a round bar with a diameter of 15 mm. After hot forging, the round bar was allowed to cool in atmosphere. Subsequently, the round bar was subjected to quenching and tempering as a simulated heat treatment after bolt forming, and the tensile strength of the round bar was adjusted to approximately 1200 MPa. After the tensile strength of the round bar was adjusted, the round bar was subjected to machining to manufacture a test specimen with an annular V-notch illustrated in FIG. 2. The numerical values for which a unit is not shown in FIG. 2 represent the dimensions (unit: mm) of a corresponding region of the test specimen. In FIG. 2, "ϕ numerical value" represents the diameter (mm) at the specified region. In FIG. 2, "60°" indicates that the V-notch angle is 60°. Further, "0.175R" indicates that radius of the bottom of the V-notch is 0.175 mm.

The electrolytic charging method was used to introduce hydrogen of various concentrations into the respective test specimens of the steels a to m. The electrolytic charging method was conducted in the following manner. Each test specimen was immersed in an ammonium thiocyanate aqueous solution. While the test specimen was in the immersed state, an anode potential was generated on the surface of the test specimen to introduce hydrogen into the test specimen. Thereafter, a galvanizing coating was formed on the surface of each test specimen to prevent a dispersion of the hydrogen in the test specimen. Next, a constant load test that applied Referring to FIG. 1, as fn2 increases, that is, as the ratio of the Si content to the Mn content increases, HR noticeably rises. Further, when fn2 becomes 1.0 or more, HR becomes 1.20 or more, and excellent hydrogen embrittlement resistance characteristics are obtained. When fn2 is 1.0 or more, HR does not change significantly even if fn2 increases.

The high-strength bolt, according to the present invention that was completed based on the findings described above, has a chemical composition that consists of, in mass %, C: 0.22 to 0.40%, Si: 0.10 to 1.50%, Mn: 0.20 to less than 0.40%, P: 0.020% or less, S: 0.020% or less, Cr: 0.70 to 1.45%, Al: 0.005 to 0.060%, Ti: 0.010 to 0.0450%, B: 0.0003 to 0.0040%, N: 0.0015 to 0.0080%, O: 0.0020% or less, Cu: 0 to 0.50%, Ni: 0 to 0.30%, Mo: 0 to 0.04%, V: 0 to 0.05% and Nb: 0 to 0.050%, with a balance being Fe and impurities, and that satisfies Formula (1) and Formula (2), wherein the bolt has a tensile strength of 1000 to 1300 MPa:

$$0.50 \leq C + Si/10 + Mn/5 + 5Cr/22 \leq 0.85 \tag{1}$$

$$Si/Mn > 1.0 \tag{2}$$

where, a content (mass %) of a corresponding element is substituted for each symbol of an element in Formula (1) and Formula (2).

The high-strength bolt according to the present invention may further contain one or more types selected from a group consisting of, in mass %, Cu: 0.02 to 0.50%, Ni: 0.03 to 0.30%, Mo: 0.01 to 0.04% and V: 0.005 to 0.05%.

The high-strength bolt according to the present invention may further contain, in mass %, Nb: 0.0015 to 0.050%.

Preferably, at the root of the thread of the high-strength bolt, the absolute value of compressive residual stress of the outer layer of the root of the thread is 10 to 90% of the tensile strength of the high-strength bolt. In this case, hydrogen embrittlement resistance characteristics are further enhanced.

Hereunder, the high-strength bolt according to the present invention will be described in further detail. The symbol "%" in relation to an element means "mass %" unless specifically stated otherwise.

[Chemical Composition]

The chemical composition of the high-strength bolt of the present embodiment contains the following elements.

C: 0.22 to 0.40%

Carbon (C) increases hardenability of a bolt, and raises tensile strength of a bolt after quenching and tempering to 1000 MPa or more. If the C content is less than 0.22%, the aforementioned effects are not obtained. On the other hand, if the C content is more than 0.40%, the hardenability will be too high. In this case, the strength of the steel material for the bolt after hot working will be too high, and the cold workability will decrease. Consequently, for the purpose of softening the steel material, a heat treatment must be performed multiple times for an extended time period on the steel material prior to performing wire drawing and cold working such as cold forging, and hence the production cost rises. Furthermore, if the heat treatment is performed, the hydrogen embrittlement resistance characteristics decrease. Accordingly, the C content is from 0.22 to 0.40%. A preferable lower limit of the C content is 0.24%, and more preferably is 0.26%. A preferable upper limit of the C content is 0.38%, and more preferably is 0.35%.

Si: 0.10 to 1.50%

Silicon (Si) suppresses precipitation of cementite and enhances temper softening resistance. Si also deoxidizes steel. MnO—$SiO_2$ that is a deoxidation product is a vitrified soft inclusion, and is elongated and fragmented during hot rolling and thereby refined. Therefore, the hydrogen embrittlement resistance characteristics are enhanced. If the Si content is less than 0.10%, the aforementioned effects are not obtained. On the other hand, if the Si content is more than 1.50%, the strength will be too high. In such a case, the ductility and cold forgeability of the steel will decrease. Therefore, the Si content is from 0.10 to 1.50%. A preferable lower limit of the Si content is more than 0.35%, more preferably is 0.40%, further preferably is 0.45%, and still further preferably is more than 0.50%. A preferable upper limit of the Si content is 1.20%, and further preferably is 1.00%.

Mn: 0.20 to less than 0.40%

Manganese (Mn) increases the hardenability to provide the bolt with the tensile strength of 1000 MPa or more. In addition, Mn bonds with Si to form inclusions (MnO—$SiO_2$). Since the inclusions are soft and are elongated and fragmented during hot rolling and thereby refined, the density of the MnO—$SiO_2$ decreases and the hydrogen embrittlement resistance characteristics are enhanced. If the Mn content is less than 0.20%, this effect is not obtained. On the other hand, if the Mn content is 0.40% or more, the Mn will segregate at the crystal grain boundary and will promote grain boundary fracture. Accordingly, the Mn content is from 0.20 to less than 0.40%. A preferable lower limit of the Mn content is 0.220%, and more preferably is 0.25%. A preferable upper limit of the Mn content is 0.38%, and more preferably is 0.35%.

P: 0.020% or Less

Phosphorous (P) is an impurity. P segregates at the crystal grain boundary and decreases the cold workability and lowers the hydrogen embrittlement resistance characteristics of the bolt. Accordingly, the P content is 0.020% or less. A preferable upper limit of the P content is 0.015%. Preferably, the P content is as low as possible.

S: 0.020% or Less

Sulfur (S) is an impurity. S forms sulfides and decreases the cold workability and lowers the hydrogen embrittlement resistance characteristics of the bolt. Accordingly, the S content is 0.020% or less. A preferable upper limit of the S content is 0.010%, and more preferably is 0.008%. Preferably, the S content is as low as possible.

Cr: 0.70 to 1.45%

Chromium (Cr) increases the hardenability to make the tensile strength of the bolt 1000 MPa or more. Cr also enhances the hydrogen embrittlement resistance characteristics of the bolt. If the Cr content is less than 0.70%, these effects are not obtained. On the other hand, if the Cr content is more than 1.45%, the hardenability will be too high, and the cold workability of asteel material for the bolt will decrease. Accordingly, the Cr content is from 0.70 to 1.45%. A preferable lower limit of the Cr content is 0.90%. An upper limit of the Cr content is 1.20%.

Al: 0.005 to 0.060%

Aluminum (Al) deoxidizes a steel. If the Al content is less than 0.005%, this effect is not obtained. On the other hand, if the Al content is more than 0.060%, coarse oxide-based inclusions will be generated and the cold workability will decrease. Accordingly, the Al content is from 0.005 to 0.060%. A preferable lower limit of the Al content is 0.010%. A preferable upper limit of the Al content is 0.055%. In the chemical composition of the high-strength bolt according to the present invention, the term "Al content" means the total amount of Al contained in a steel material.

Ti: 0.010 to 0.045%

Titanium (Ti) bonds with N in a steel to form nitrides (TiN). As a result of the formation of TiN, the formation of BN is suppressed and the amount of dissolved B increases. Consequently, the hardenability of a steel material is enhanced. Ti also bonds with C to form carbides (TiC) and refine the grains. By this means, the hydrogen embrittlement resistance characteristics of the bolt are enhanced. If the Ti content is less than 0.010%, these effects are not obtained. On the other hand, if the Ti content is more than 0.045%, coarse TiN is formed in a large amount. In this case, the cold workability and hydrogen embrittlement resistance characteristics will decrease. Accordingly, the Ti content is from 0.010 to 0.045%. A preferable lower limit of the Ti content is 0.015%. A preferable upper limit of the Ti content is 0.040%.

B: 0.0003 to 0.0040%

Boron (B) increases the hardenability of a steel. B also suppresses grain boundary segregation of P to enhance the hydrogen embrittlement resistance characteristics of the bolt. If the B content is less than 0.0003%, these effects are not obtained. On the other hand, if the B content is more than 0.0040%, the effect of increasing the hardenability is saturated. In addition, coarse BN is formed and the cold workability decreases. Accordingly, the B content is from 0.0003 to 0.0040%. A preferable lower limit of the B content is 0.0005%. A preferable upper limit of the B content is 0.0025%.

N: 0.0015 to 0.0080%

Nitrogen (N) bonds with Ti in a steel to form nitrides and refines the grains. If the N content is less than 0.0015%, this effect is not obtained. On the other hand, if the N content is more than 0.0080%, the effect is saturated. In addition, N bonds with B to form nitrides, and thereby reduces the amount of dissolved B. In this case, the hardenability of a steel decreases. Accordingly, the N content is from 0.0015 to 0.0080%. A preferable lower limit of the N content is 0.0020%. A preferable upper limit of the N content is 0.0070%.

O: 0.0020% or Less

Oxygen (O) is an impurity. O forms oxides and decreases the cold workability. If the O content is more than 0.0020%, oxides are formed in a large amount and MnS coarsens and the cold workability significantly decreases. Accordingly, the O content is 0.0020% or less. A preferable upper limit of the O content is 0.0018%. Preferably, the O content is as low as possible.

The balance of the chemical composition of the high-strength bolt according to the present invention is Fe and impurities. Here, the term "impurities" refers to elements which, during industrial production of the high-strength bolt, are mixed in from ore or scrap that is used as a raw material, or from the production environment or the like, and which are allowed within a range that does not adversely affect the present invention.

[Optional Elements]

The aforementioned high-strength bolt may further contain one or more types selected from the group consisting of Cu, Ni, Mo and V as a substitute for a part of Fe. Each of these elements is an optional element, and each of these elements increases the hardenability of a steel.

Cu: 0 to 0.50%

Copper (Cu) is an optional element, and may not be contained in a steel. In a case where Cu is contained, the Cu increases the hardenability of a steel. However, if the Cu content is more than 0.50%, the hardenability will be too high and the cold workability will decrease. Accordingly, the Cu content is from 0 to 0.50%. A preferable lower limit of the Cu content for more effectively obtaining the aforementioned effect is 0.02%, and further preferably is 0.05%. A preferable upper limit of the Cu content is 0.30%, and further preferably is 0.20%.

Ni: 0 to 0.30%

Nickel (Ni) is an optional element, and may not be contained in a steel. In a case where Ni is contained, the Ni increases the hardenability of a steel, and also increases the toughness of a steel material after quenching. However, if the Ni content is more than 0.30%, the hardenability will be too high and the cold workability will decrease. Accordingly, the Ni content is from 0 to 0.30%. A preferable lower limit of the Ni content for more effectively obtaining the aforementioned effects is 0.03%, and further preferably is 0.05%. A preferable upper limit of the Ni content is 0.20%, and further preferably is 0.10%.

Mo: 0 to 0.04%

Molybdenum (Mo) is an optional element, and may not be contained in a steel. In a case where Mo is contained, the Mo increases the hardenability of a steel. However, if the Mo content is more than 0.04%, the hardenability will be too high and the cold workability of a steel material for the high-strength bolt will decrease. Accordingly, the Mo content is from 0 to 0.04%. A preferable lower limit of the Mo content for more effectively obtaining the aforementioned effect is 0.01%, and further preferably is 0.015%. A preferable upper limit of the Mo content is 0.03%, and further preferably is 0.025%.

V: 0 to 0.05%

Vanadium (V) is an optional element, and may not be contained in a steel. In a case where V is contained, the V increases the hardenability of a steel. V also forms carbides, nitrides or carbo-nitrides and refines the grains. However, if the V content is more than 0.05%, the carbides or the like will coarsen and the cold workability will decrease. Accordingly, the V content is from 0 to 0.05%. A preferable lower limit of the V content for more effectively obtaining the aforementioned effects is 0.005%. A preferable upper limit of the V content is 0.03%, and more preferably is 0.02%.

The chemical composition of the high-strength bolt according to the present invention may further contain Nb as a substitute for a part of Fe.

Nb: 0 to 0.050%

Niobium (Nb) is an optional element, and may not be contained in a steel. In a case where Nb is contained, the Nb bonds with C and N to form carbides, nitrides or carbo-nitrides and refines the grains. Nb also enhances the hydrogen embrittlement resistance characteristics of the bolt. However, if the Nb content is more than 0.050%, coarse carbides or the like are formed and the cold workability of a steel material decreases. Accordingly, the Nb content is from 0 to 0.050%. A preferable lower limit of the Nb content for more effectively obtaining the aforementioned effects is 0.0015%. A preferable upper limit of the Nb content is 0.040%, and more preferably is 0.030%.

[Regarding Formula (1)]

The chemical composition of the high-strength bolt according to the present invention also satisfies Formula (1).

$$0.50 \leq C + Si/10 + Mn/5 + 5Cr/22 \leq 0.85 \quad (1)$$

The content (mass %) of a corresponding element is substituted for each symbol of an element in Formula (1). If the corresponding element is at an impurity level, "0" is substituted for the symbol of the corresponding element in Formula (1).

$fn1 = C + Si/10 + Mn/5 + 5Cr/22$ is an index of the strength and cold workability of a steel material. fn1 indicates the carbon equivalent of a steel material. If fn1 is too low, sufficient hardenability is not obtained, and strength cannot be obtained. On the other hand, if fn1 is too high, the hardenability will be too high. In this case, when a steel for a high-strength bolt is rolled into a wire rod, bainite is formed and the strength and hardness of a steel material will be too high. Consequently, sufficient cold workability is not obtained unless a softening heat treatment for an extended time period is carried out multiple times prior to a wire drawing process and a cold forging process that are subsequent processes. If fn1 is from 0.50 to 0.85, while obtaining excellent hardenability, sufficient cold workability is obtained even if a softening heat treatment is not performed for an extended time period. A preferable lower limit of fn1 is 0.53. A preferable upper limit of fn1 is 0.83.

[Regarding Formula (2)]

The chemical composition of the high-strength bolt according to the present invention further satisfies Formula (2):

$$Si/Mn > 1.0 \quad (2)$$

where, the content (mass %) of a corresponding element is substituted for each symbol of an element in Formula (2). If the corresponding element is at an impurity level, "0" is substituted for the symbol of the corresponding element in Formula (2).

It is defined that $fn2 = Si/Mn$. Si and Mn generate $MnO-SiO_2$ in the course of deoxidation. The fusing point of $MnO-SiO_2$ is around 1250° C. Consequently, although $MnO-SiO_2$ is a liquid in molten metal before solidification, $MnO-SiO_2$ becomes a solid in a billet after solidification, and becomes a vitrified soft inclusion. The inclusion is elongated and fragmented during hot rolling and thereby refined. Therefore, the fatigue strength increases and the hydrogen embrittlement resistance characteristics improve. In order to obtain refined $MnO-SiO_2$, it is necessary to appropriately control the proportion of Si with respect to Mn. The index for this is fn2.

Referring to FIG. 1, as fn2 increases, HR significantly rises. When fn2 becomes more than 1.0, HR becomes 1.20 or more, and excellent hydrogen embrittlement resistance characteristics are obtained. Further, when fn2 is 1.0 or more, HR does not change significantly even if fn2 increases. That is, HR with respect to fn2 has an inflection point in the vicinity of fn2=1.0. Accordingly, as shown in Formula (2), fn2>1.0. A preferable lower limit of fn2 is 1.1.

[Regarding Compressive Residual Stress at Thread Root]

Preferably, at the thread root of the high-strength bolt according to the present invention, the absolute value of the compressive residual stress of the outer layer of the thread root is 10 to 90% of the tensile strength of the high-strength bolt.

In this case, the tensile stress acting on the thread root when fastening the bolt is offset by the compressive residual stress. Therefore, the stress state at the starting point is eased, and it becomes difficult for ruptures that accompany hydrogen embrittlement to occur. If the (absolute value of the) compressive residual stress is less than 10% of the (absolute value of the) tensile strength, an effect of offsetting the tensile stress by means of the compressive residual stress is insufficient, and excellent hydrogen embrittlement resistance characteristics are not obtained. On the other hand, even if the (absolute value of the) compressive residual stress is more than 90% of the (absolute value of the) tensile strength, the aforementioned effect is saturated. Therefore, the compressive residual stress is 10 to 90% of the tensile strength.

As used herein, the term "outer layer" refers to an area from the surface of the high-strength bolt to a depth of 50 µm in the direction toward the central axis. The compressive residual stress is measured by a well-known X-ray method. Specifically, an X-ray stress measurement method that utilizes X-ray diffraction in accordance with JIS B 2711 (2013) is used. The measurement is performed using Mn Kα rays as the characteristic X-ray type, a Cr filter, a reference diffraction angle $2\theta_0$: 152.0°, an η angle of 14.0°, and an X-ray stress constant K: −336 MPa/°. Further, the measurement region is centered on the middle position of the thread root. The tensile strength is determined in accordance with JIS Z 2241 (2011).

[Production Method]

An example of a method for producing the high-strength bolt according to the present invention will now be described. First, steel material for the high-strength bolt is produced by a well-known production method (starting material production process). Thereafter, the high-strength bolt is produced using a steel material for the high-strength bolt (high-strength bolt production process). Hereunder, the respective processes are described.

[Starting Material Production Process]

Molten steel having the aforementioned chemical compositions is produced. A cast piece is produced by a continuous casting process using the molten steel. Alternatively, an ingot is produced by an ingot-making process using the molten steel. The produced cast piece or ingot is subjected to billeting to form a billet. The billet is subjected to hot working to form steel material (wire rod) for the high-strength bolt. The hot working is, for example, hot rolling.

[High-strength Bolt Production Process]

In the high-strength bolt production process, the high-strength bolt is produced using a steel material for the high-strength bolt. The high-strength bolt production process includes a wire drawing process, a cold forging process, a thread machining process, and a quenching and tempering process. Each of these processes is described hereunder.

[Wire Drawing Process]

First, the wire rod is subjected to wire-drawing to produce steel wire. The wire-drawing may be only primary wire drawing, or may be wire-drawing that is carried out multiple times such as a primary wire drawing, a secondary wire drawing and the like. When performing the wire drawing, a lubricant coating is to be formed on the surface of the wire rod. The lubricant coating is, for example, a phosphate coating or a non-phosphorus-based lubricant coating.

Preferably a lubricant coating that does not contain P is used. Alternatively, in the case of using a phosphate coating, the surface of a steel material (steel wire) is cleaned or pickled to remove the phosphate coating from the surface before performing a quenching process that is described later. The cleaning is, for example, a well-known alkaline cleaning.

[Cold Forging Process]

The steel material that underwent wire drawing is cut to a predetermined length, and the steel material that was cut is subjected to cold forging to produce a high-strength bolt.

[Regarding Softening Heat Treatment]

In the conventional method for producing a high-strength bolt, to soften steel material (wire rod) for a bolt in which the strength is too high, a softening heat treatment is performed multiple times before wire drawing and before cold forging. However, with the high-strength bolt according to the present invention, because Formula (1) is satisfied, such a softening heat treatment can be simplified. By this means, an increase in the production cost that is caused by carrying out the softening heat treatment can be suppressed, and the hydrogen embrittlement resistance characteristics of the high-strength bolt can also be enhanced.

[Thread Machining Process]

The high-strength bolt produced by cold forging is subjected to thread rolling under well-known conditions to form thread ridges.

[Quenching and Tempering Process]

After undergoing the thread machining, the high-strength bolt is subjected to quenching and tempering under well-known conditions to adjust the tensile strength of the high-strength bolt to 1000 to 1300 MPa. If the tensile strength is less than 1000 MPa, the strength of the bolt will be insufficient. On the other hand, if the tensile strength is more than 1300 MPa, hydrogen susceptibility will increase, and the hydrogen embrittlement resistance characteristics will decrease. Therefore, the tensile strength of the high-strength bolt is from 1000 to 1300 MPa. In a case where a lubricant coating containing P such as a phosphate coating is utilized when performing the wire drawing process, as described above, preferably the surface of the steel material (steel wire) is subjected to alkaline cleaning before performing quenching.

[Compressive Residual Stress Imparting Process]

Preferably, after undergoing the quenching and tempering, the high-strength bolt is subjected to a well-known compressive residual stress imparting process to make the compressive residual stress of the outer layer at the thread root 10 to 90% of the tensile strength of the high-strength bolt. For example, a shot peening process is a well-known compressive residual stress imparting process. By appropriately adjusting the conditions of the shot peening process, the compressive residual stress of the outer layer at the thread root can be made 10 to 90% of the tensile strength of the high-strength bolt.

Although in the above-described production method, the thread machining process is performed before quenching and tempering (prior rolling process), the thread machining process may be performed after quenching and tempering (post rolling process) instead of the prior rolling process. In this case, a compressive residual stress that is 10 to 90% of the tensile strength of the high-strength bolt can be imparted to the outer layer of the thread root. In a case where the post rolling process is adopted, the shot peening process need not be performed.

The high-strength bolt of the present invention is produced by the foregoing production process.

EXAMPLES

Molten steel having the chemical compositions in Table 2 were produced.

TABLE 2

| | Chemical Composition (unit is mass percent; balance is Fe and impurities) | | | | | | | | | | | | | | | | | |
|---|---|---|---|---|---|---|---|---|---|---|---|---|---|---|---|---|---|---|
| Steel | C | Si | Mn | P | S | Cr | Al | Ti | B | N | O | Cu | Ni | Mo | V | Nb | fn1 | fn2 |
| A | 0.31 | 0.42 | 0.33 | 0.009 | 0.010 | 1.06 | 0.036 | 0.021 | 0.0025 | 0.0044 | 0.0011 | — | — | — | — | — | 0.66 | 1.27 |
| B | 0.37 | 0.41 | 0.39 | 0.008 | 0.011 | 1.16 | 0.038 | 0.019 | 0.0019 | 0.0032 | 0.0011 | — | — | — | — | — | 0.75 | 1.05 |
| C | 0.26 | 0.65 | 0.25 | 0.006 | 0.009 | 1.05 | 0.040 | 0.024 | 0.0030 | 0.0039 | 0.0012 | — | — | — | — | — | 0.61 | 2.60 |
| D | 0.35 | 0.80 | 0.34 | 0.012 | 0.010 | 1.21 | 0.039 | 0.022 | 0.0027 | 0.0041 | 0.0013 | 0.02 | 0.04 | 0.04 | — | — | 0.77 | 2.35 |
| E | 0.30 | 0.66 | 0.25 | 0.010 | 0.006 | 1.24 | 0.031 | 0.021 | 0.0025 | 0.0045 | 0.0016 | 0.02 | 0.06 | 0.03 | 0.03 | — | 0.70 | 2.64 |
| F | 0.29 | 0.41 | 0.31 | 0.010 | 0.009 | 1.42 | 0.032 | 0.020 | 0.0024 | 0.0040 | 0.0015 | 0.02 | 0.03 | 0.02 | 0.01 | 0.030 | 0.72 | 1.32 |
| G | 0.33 | 0.65 | 0.55 | 0.011 | 0.009 | 0.92 | 0.028 | 0.026 | 0.0031 | 0.0040 | 0.0018 | — | — | — | — | — | 0.71 | 1.18 |
| H | 0.23 | 0.32 | 0.26 | 0.010 | 0.015 | 0.72 | 0.031 | 0.024 | 0.0023 | 0.0038 | 0.0012 | — | — | — | — | — | 0.48 | 1.23 |
| I | 0.39 | 1.25 | 0.39 | 0.010 | 0.005 | 1.26 | 0.032 | 0.021 | 0.0015 | 0.0040 | 0.0012 | — | — | — | — | — | 0.88 | 3.21 |
| J | 0.34 | 0.36 | 0.38 | 0.011 | 0.009 | 0.74 | 0.028 | 0.018 | 0.0022 | 0.0061 | 0.0015 | — | — | — | — | — | 0.62 | 0.95 |
| K | 0.29 | 0.12 | 0.38 | 0.010 | 0.003 | 0.75 | 0.032 | 0.022 | 0.0019 | 0.0040 | 0.0014 | — | — | 0.02 | — | — | 0.55 | 0.32 |
| L | 0.36 | 0.24 | 0.66 | 0.008 | 0.006 | 1.04 | 0.046 | 0.003 | — | 0.0060 | 0.0021 | 0.02 | 0.02 | 0.22 | — | — | 0.75 | 0.36 |
| M | 0.31 | 0.43 | 0.32 | 0.011 | 0.006 | 1.18 | 0.038 | 0.051 | 0.0022 | 0.0035 | 0.0015 | — | — | — | — | — | 0.69 | 1.34 |

Referring to Table 2, as described above, steel L had a chemical composition corresponding to the chemical composition of SCM435 of JIS G4053 (2008).

Billets having a transverse cross-section of 162 mm×162 mm were produced by a continuous casting process using the molten steel. Each billet was subjected to hot working (hot rolling) to produce a wire rod with a diameter of 11.5 mm.

The wire rods of the respective test numbers shown in Table 3 were subjected to wire-drawing to produce steel wire. At such time, a heat treatment was performed for the purpose of softening. The heat treatment temperature was 750° C., the heat treatment time period was 60 minutes, and slow cooling was performed after the heat treatment. In addition, after degreasing and pickling, a zinc phosphate treatment (75° C., immersion time: 600 seconds) and a metallic soap treatment (80° C., immersion time: 180 seconds) were performed to form a lubrication-treated film composed of a zinc phosphate film and a metallic soap film on the surface. Thereafter, finishing wire-drawing was performed to produce steel wire with a diameter of 10.5 mm. The steel wire was adopted as the starting material for forging the high-strength bolt.

TABLE 3

| | | | | | | Thermal Refining | | |
|---|---|---|---|---|---|---|---|---|
| Test Number | Steel | fn1 | fn2 | Bolt Forming Possible/ Not Possible | Prior Rolling | Quenching Temperature (° C.) | Tempering Temperature (° C.) | Post Rolling |
| 1 | A | 0.66 | 1.27 | Possible | — | 880 | 530 | ○ |
| 2 | B | 0.75 | 1.05 | Possible | — | 880 | 550 | ○ |
| 3 | C | 0.61 | 2.60 | Possible | — | 900 | 515 | ○ |
| 4 | D | 0.77 | 2.35 | Possible | — | 890 | 560 | ○ |
| 5 | E | 0.70 | 2.64 | Possible | — | 880 | 560 | ○ |
| 6 | F | 0.72 | 1.32 | Possible | — | 900 | 520 | ○ |
| 7 | D | 0.77 | 2.35 | Possible | ○ | 900 | 560 | — |
| 8 | E | 0.70 | 2.64 | Possible | ○ | 890 | 560 | — |
| 9 | G | 0.71 | 1.18 | Possible | — | 900 | 520 | ○ |
| 10 | H | 0.48 | 1.23 | Possible | — | 880 | 435 | ○ |
| 11 | I | 0.88 | 3.21 | Not Possible | — | — | — | — |
| 12 | J | 0.62 | 0.95 | Possible | — | 900 | 435 | ○ |
| 13 | K | 0.55 | 0.32 | Possible | — | 900 | 440 | ○ |
| 14 | L | 0.75 | 0.36 | Possible | — | 880 | 520 | ○ |
| 15 | M | 0.69 | 1.34 | Not Possible | — | — | — | — |

| Test Number | Compressive Residual Stress at Thread Root (MPa) | Tensile Strength (MPa) | Proportion (%) of Compressive Residual Stress Relative to Tensile Strength | HR | Hydrogen Embrittlement Resistance Characteristics Evaluation | Remarks |
|---|---|---|---|---|---|---|
| 1 | −350 | 1200 | 29.2 | 1.38 | ○ | Inventive Example |
| 2 | −400 | 1200 | 33.3 | 1.40 | ○ | Inventive Example |
| 3 | −320 | 1200 | 26.7 | 1.44 | ○ | Inventive Example |
| 4 | −250 | 1180 | 21.2 | 1.50 | ○ | Inventive Example |
| 5 | −380 | 1200 | 31.7 | 1.52 | ○ | Inventive Example |
| 6 | −410 | 1220 | 33.6 | 1.47 | ○ | Inventive Example |

TABLE 3-continued

| | | | | | | |
|---|---|---|---|---|---|---|
| 7 | −20 | 1200 | 1.7 | 1.21 | ○ | Inventive Example |
| 8 | 0 | 1200 | 0.0 | 1.20 | ○ | Inventive Example |
| 9 | −290 | 1200 | 24.2 | 1.10 | x | Comparative Example |
| 10 | −120 | 900 | 13.3 | — | x | Comparative Example |
| 11 | — | — | — | — | x | Comparative Example |
| 12 | −280 | 1200 | 23.3 | 1.15 | x | Comparative Example |
| 13 | −310 | 1180 | 26.3 | 1.09 | x | Comparative Example |
| 14 | −270 | 1220 | 22.1 | 1.00 | x | Comparative Example |
| 15 | — | — | — | — | x | Comparative Example |

Figure 3:
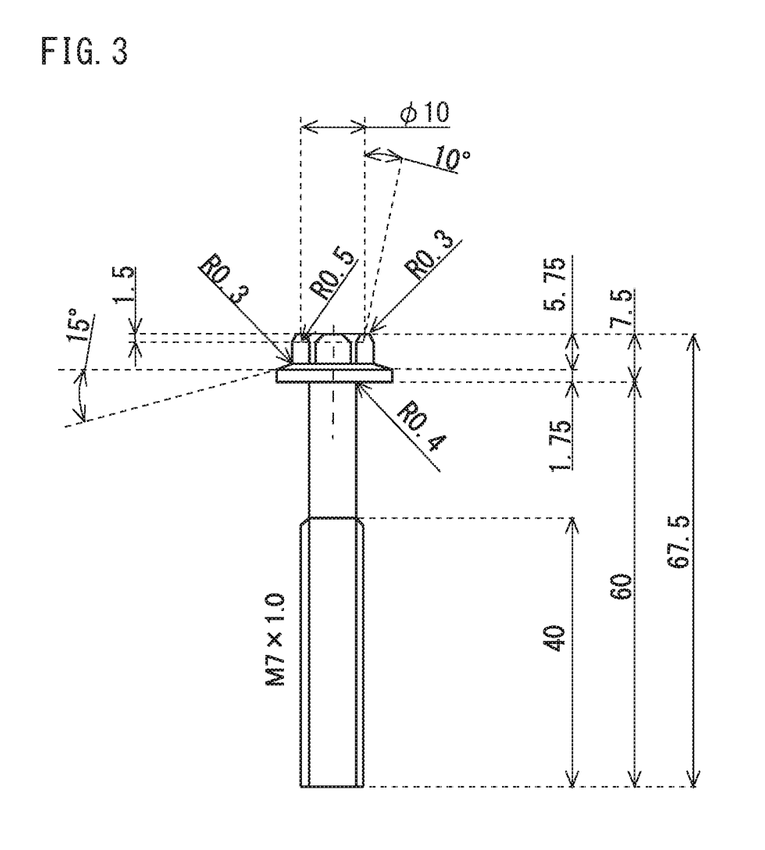
FIG. 3 illustrates a side view of a thread that was produced in the Examples.

The steel wire of each test number was subjected to cold forging to produce the high-strength bolt illustrated in FIG. 3. Specifically, cold forging was performed in two stages. In the first stage, the shank of the high-strength bolt was formed by force-feeding. In the second stage, a die was designed so as to perform processing to form the head and the flange part of the high-strength bolt, and the die was mounted in a hydraulic forging press machine and cold forging was performed. The respective numerical values in FIG. 3 represent the dimensions (mm) of a corresponding region. In the drawing, "φ numerical value" represents the diameter (mm) of the specified region, and "numerical value °" represents the angle (°) of the specified region. "R numerical value" represents the radius of curvature (mm) of the specified region. Further, "M7× 1.0" in the drawing indicates that the external diameter is 7 mm and the pitch is 1.0 mm.

After forming the high-strength bolt, the high-strength bolt was visually observed to check for the occurrence of cracking. Test numbers in which cracking of the bolt was observed were regarded as tests in which formation of a bolt was not possible.

The high-strength bolts of test numbers in which cracking was not observed were subjected to quenching and tempering at the temperatures shown in Table 3. Prior to performing quenching, the surface of the high-strength bolt was subjected to alkaline cleaning to remove the phosphate coating.

In the quenching, the high-strength bolt was held for 40 minutes at the quenching temperature (° C.) shown in Table 3, and was thereafter subjected to oil quenching. In the tempering, the high-strength bolt was held for 70 minutes at the tempering temperature shown in Table 3. The respective high-strength bolts were produced by the foregoing processes. Note that, with respect to a case where the tempering temperature for obtaining the desired tensile strength (1000 to 1300 MPa) of the bolt was less than 435° C., it was determined that the strength was insufficient, and an evaluation of the hydrogen embrittlement resistance characteristics was not performed and the relevant case was determined as being unqualified for the present invention.

The steel wires of Test Numbers 1 to 6, 9, 10, and 12 to 14 were subjected to quenching and tempering which were followed by thread rolling, and residual stress was imparted to the surface of the thread root together with thread machining. The steel wires of Test Number 13 and Test Number 14 were subjected to thread rolling prior to quenching and tempering. The compressive residual stress of the outer layer of the thread root was measured using an X-ray stress measurement method utilizing X-ray diffraction in accordance with JIS B 2711 (2013). The measurement was performed, using Mn Kα rays as the characteristic X-ray type, a Cr filter, a reference diffraction angle $2\theta_0$: 152.0°, an η angle of 14.0°, and an X-ray stress constant K: −336 MPa/°. Further, the measurement region was centered on the middle position of the thread root.

[Tensile Test]

The tensile strength (MPa) of the high-strength bolt of each test number after quenching and tempering or thread rolling was measured in atmosphere at room temperature (25° C.) in accordance with JIS B 1051 (2000). The measurement results are shown in Table 3.

[Hydrogen Embrittlement Resistance Characteristics Evaluation Test]

The high-strength bolt of each test number after quenching and tempering or thread rolling was machined to manufacture a test specimen with an annular V-notch illustrated in FIG. 2, and the electrolytic charging method was used to introduce hydrogen of various concentrations into the respective test specimens. The electrolytic charging method was performed in the following manner. The relevant high-strength bolt was immersed in ammonium thiocyanate aqueous solution. In a state in which the high-strength bolt was immersed in the solution, an anode potential was generated on the surface of the high-strength bolt to thereby introduce hydrogen into the high-strength bolt.

After hydrogen was introduced inside the high-strength bolt, a galvanizing coating was formed on the high-strength bolt surface to prevent a dispersion of the hydrogen contained in the high-strength bolt. Next, a constant load test that applied a tensile strength equivalent to 95% of the tensile strength of the high-strength bolt was performed. Programmed temperature gas chromatography was performed using a gas chromatography apparatus with respect to high-strength bolts that ruptured during the test and high-strength bolts that did not rupture to thereby measure the amount of hydrogen in each high-strength bolt. After measurement, with respect to each test number, the maximum hydrogen amount at which a test specimen did not rupture was defined as the critical diffusible hydrogen content Hc.

In addition, the critical diffusible hydrogen content of the steel wire of Test Number 14 that had a chemical composition corresponding to the chemical composition of SCM435 of the JIS Standard that is used for the conventional bolts was adopted as the reference (Href) for the critical diffusible hydrogen content ratio HR. The critical diffusible hydrogen content ratio HR was determined using Formula (A) by taking the critical diffusible hydrogen content Href as a reference. As the hydrogen embrittlement resistance characteristics evaluation, test specimens for which the value of HR was 1.2 or more were regarded as "pass" ("O" in Table 3), while test specimens for which the value of HR was less than 1.2 were regarded as "fail" ("x" in Table 3).

[Test Results]

The test results are shown in Table 3.

The respective chemical compositions of the high-strength bolts of Test Numbers 1 to 6 were appropriate. In addition, fn1 satisfied Formula (1), and fn2 satisfied Formula (2). Further, the absolute value of compressive residual stress at the surface of the thread root of the high-strength bolt satisfied the condition of being within a range of 10 to 90% of the tensile strength of the high-strength bolt. As a result, while the high-strength bolts of these test numbers has a high tensile strength of 1000 to 1300 MPa, the critical diffusible hydrogen content ratio HR of the high-strength bolts was 1.20 or more and the high-strength bolts were excellent in hydrogen embrittlement resistance characteristics.

The chemical compositions of the high-strength bolts of Test Number 7 and Test Number 8 were appropriate. In addition, fn1 satisfied Formula (1) and fn2 satisfied Formula (2). As a result, although the high-strength bolts of these test numbers had a high tensile strength of 1200 MPa, the critical diffusible hydrogen content ratio HR of these high-strength bolts was 1.20 or more, and the high-strength bolts were excellent in hydrogen embrittlement resistance characteristics. However, because the absolute value of compressive residual stress at the surface of the thread root of each of the high-strength bolts was less than 10% of the tensile strength of the high-strength bolt, the HR value was low in comparison to Test Numbers 1 to 6.

On the other hand, the Mn content of Test Number 9 was too high. Therefore, the HR was a low ratio that was less than 1.20, and the hydrogen embrittlement resistance characteristics were low.

In the high-strength bolt of Test Number 10, fn1 was less than the lower limit of Formula (1). Therefore, the tensile strength was less than 1000 MPa.

In the high-strength bolt of Test Number 11, fn1 was more than the upper limit of Formula (1). Therefore, the cold workability of the steel material (wire rod) for the high-strength bolt was low, and cracking was observed in the high-strength bolt after cold forging, and therefore the subsequent treatments and tests were not performed.

In Test Number 12 and Test Number 13, fn2 did not satisfy Formula (2). Consequently, the HR was less than 1.20 and the hydrogen embrittlement resistance characteristics were low.

In the high-strength bolt of Test Number 15, the Ti content was too high. Therefore, the cold workability of the steel material (wire rod) for the high-strength bolt was low, and cracking was observed in the high-strength bolt after cold forging, and therefore the subsequent treatments and tests were not performed.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

The invention claimed is:

1. A high-strength bolt comprising a chemical composition consisting of, in mass %:
C: 0.22 to 0.40%,
Si: 0.10 to 1.50%,
P: 0.020% or less,
S: 0.020% or less,
Cr: 0.70 to 1.45%,
Al: 0.005 to 0.060%,
Ti: 0.010 to 0.045%,
B: 0.0003 to 0.0040%,
N: 0.0015 to 0.0080%,
O: 0.0020% or less,
Cu: 0 to 0.50%,
Ni: 0 to 0.30%,
Mo: 0 to 0.04%,
V: 0 to 0.05%, and
Nb: 0 to 0.050%, with a balance being Fe and impurities, and that satisfies Formula (1) and Formula (2),
wherein the high-strength bolt has a tensile strength of 1000 to 1300 MPa,
wherein a critical diffusible hydrogen content ratio HR, defined by Formula (A), is 1.20 or more:

$$0.50 \leq C+Si/10+Mn/5+5Cr/22 \leq 0.85 \quad (1)$$

$$Si/Mn > 1.0 \quad (2)$$

$$HR = Hc/Href, \quad (A)$$

where, a content (mass %) of a corresponding element is substituted for each symbol of an element in Formula (1) and Formula (2), and where, in Formula (A), a critical diffusible hydrogen content Hc is defined by a maximum hydrogen amount at which a hydrogen introduced test specimen does not rupture in a constant load test at tensile stress of nominal stress of 1080 MPa, and a critical diffusible hydrogen content Href is defined by a critical diffusible hydrogen content of a steel having a chemical composition corresponding to SCM435 of JIS G4053 (2008) as a reference.

2. The high-strength bolt according to claim 1, wherein: at a root of a thread of the high-strength bolt, an absolute value of a compressive residual stress of an outer layer of the root of the thread is 10 to 90% of the tensile strength of the high-strength bolt.

3. The high-strength bolt according to claim 1, containing one or more types selected from a group consisting of, in mass %:
Cu: 0.02 to 0.50%,
Ni: 0.03 to 0.30%,
Mo: 0.01 to 0.04%, and
V: 0.005 to 0.05%.

4. The high-strength bolt according to claim 3, containing, in mass %: Nb: 0.0015 to 0.050%.

5. The high-strength bolt according to claim 4, wherein: at a root of a thread of the high-strength bolt, an absolute value of a compressive residual stress of an outer layer of the root of the thread is 10 to 90% of the tensile strength of the high-strength bolt.

6. The high-strength bolt according to claim 3, wherein: at a root of a thread of the high-strength bolt, an absolute value of a compressive residual stress of an outer layer of the root of the thread is 10 to 90% of the tensile strength of the high-strength bolt.

7. The high-strength bolt according to claim 1, containing, in mass %: Nb: 0.0015 to 0.050%.

8. The high-strength bolt according to claim 7, wherein: at a root of a thread of the high-strength bolt, an absolute value of a compressive residual stress of an outer layer of the root of the thread is 10 to 90% of the tensile strength of the high-strength bolt.

* * * * *

UNITED STATES PATENT AND TRADEMARK OFFICE
CERTIFICATE OF CORRECTION

PATENT NO. : 10,487,372 B2
APPLICATION NO. : 15/780574
DATED : November 26, 2019
INVENTOR(S) : Yutaka Neishi et al.

Page 1 of 1

It is certified that error appears in the above-identified patent and that said Letters Patent is hereby corrected as shown below:

In the Claims

In Column 17, Claim 1, Lines 56-59:
Please delete: "C: 0.22 to 0.40%,
　　　　　　　　Si: 0.10 to 1.50%,
　　　　　　　　P: 0.020% or less,"

And insert: -- C: 0.22 to 0.40%,
　　　　　　　Si: 0.10 to 1.50%,
　　　　　　　Mn: 0.20 to less than 0.40%,
　　　　　　　P: 0.020% or less, --.

Signed and Sealed this
Third Day of March, 2020

Andrei Iancu
*Director of the United States Patent and Trademark Office*